United States Patent [19]

Kouda

[11] 4,173,987
[45] Nov. 13, 1979

[54] POWER STEERING SYSTEM

[75] Inventor: Masanori Kouda, Atsugi, Japan

[73] Assignee: Atsugi Motor Parts Co., Ltd., Atsugi, Japan

[21] Appl. No.: 862,832

[22] Filed: Dec. 21, 1977

[30] Foreign Application Priority Data

Feb. 16, 1977 [JP] Japan .................................. 52-15692
Feb. 16, 1977 [JP] Japan .............................. 52-17546[U]

[51] Int. Cl.² .............................................. F15B 9/10
[52] U.S. Cl. ............................ 137/625.23; 91/375 A; 180/143
[58] Field of Search ............. 180/143; 91/375 A, 370, 91/391 R; 137/625.21, 625.23

[56] References Cited

U.S. PATENT DOCUMENTS

| 3,867,870 | 2/1975 | Shimoura | 92/375 A X |
| 3,877,540 | 4/1975 | Masuda | 180/143 |
| 4,009,641 | 3/1977 | Robde | 91/375 A |
| 4,034,825 | 7/1977 | Adams | 91/375 A X |

Primary Examiner—Alan Cohan
Attorney, Agent, or Firm—J. Harold Nissen

[57] ABSTRACT

A hydraulic power steering system including a rotary control valve having an inner sleeve rotatable with the input stub shaft and a concentric outer sleeve mounted for rotation with the output worm shaft. The inner sleeve is formed on its outer periphery with axially extending equally spaced pressure and return slots associated with axially extending equally spaced slots for fluid flow switching operation. The inner sleeve has an annular recess on its inner periphery and an orifice radially extending through the inner sleeve for permitting the supply of pressure fluid into the annular recess. A piston member may be inserted between the inner sleeve and the stub shaft for rotation with the stub shaft and for sliding movement on the stub shaft. In a preferred embodiment of the invention, a plate member having thereon a projection such as a ball is provided for rotation with the outer sleeve. The piston member has a cutout adapted for receiving the projection to establish a temporary engagement between the piston member and the plate member under the fluid pressure supplied in the inner sleeve recess to urge the piston member toward the plate member.

9 Claims, 11 Drawing Figures

POWER STEERING SYSTEM

BACKGROUND OF THE INVENTION

1. Field of the Invention

The invention relates to a power steering system for use in automotive vehicles and, more particularly, to improvements in a power steering system including a rotary control valve adapted for providing positive steering stability.

2. Description of the Prior Art

Power steering systems containing a control valve are well-known in the art which include a torsion bar connecting an input stub shaft and an output worm shaft to provide relative angular displacement therebetween thereby permitting the control valve to switch introduction of pressurized fluid from a fluid pump between two working chambers defined at the opposite sides of the power piston. Such power steering systems can provide smooth steering performance with a less amount of torque required for the vehicle operator to apply to the steering wheel by the aid of fluid pressure exerting on the power piston. It has been found, however, that problems occur if the required steering torque is determined only by the spring constant of the torsion bar as down in the prior art. Where a torsion bar is designed to have an excessively less spring constant for the purpose of further input torque reduction, it will readily be twisted to start powr steering performance even when the road load is low and no power steering performance is required such as during high speed running; whereas it will have its size increased too much to be assembled in the prepared space and the power steering responsibility will be reduced with the torsion bar designed to have an excessively high spring constant for the purpose of providing steering reaction or "feel" similar to that of normal mechanical steering systems.

The control valve incorporated in such power steering systems normally comprises a spool valve or a rotary valve, and the latter has been found superior to the former in simplified construction and reliable performance. Such rotary valve mainly comprises an inner sleeve rotatable by one of the input and output members and formed on its outer periphery with axially extending equally spaced slots, and a concentric outer sleeve mounted around the inner sleeve in sliding and sealing contact therewith for rotation with the other thereof and formed on its inner periphery with axially extending equally spaced slots which are associated with the first described slots to switch the flow of pressurized fluid from a fluid pump between the working chambers. In such conventional rotary valves, however, it is the normal practice to supply high pressure fluid to the outside of the outer sleeve and hence introduce it through the slots into the predetermined fluid passage, while low pressure fluid is drained along the inside of the inner sleeve so that the inner sleeve is subject to axial compression forces due to pressure difference between the opposite sides thereof which cause a strain of the inner sleeve resulting in spoiled sealing performance between the inner and outer sleeves and reduced switching performance.

SUMMARY OF THE INVENTION

It is therefore a general object of the present invention is to provide an improved power steering system for automotive vehicles which will be free from the above described disadvantages found in the prior art systems.

Another object of the present invention is to provide an improved power steering system of the type including a rotary control valve which can provide a stable and reliable control valve operation.

A further object of the present invention is to provide an improved power steering system in which no pressure difference will occur between the inner and outer peripheral surfaces of the inner sleeve and the inner sleeve will be free from any strain.

A still further object of the present invention is to provide an improved power steering system having a prolonged service life.

Another object of the present invention is to provide an improved power steering system which can provide a stable steering operation.

Still another object of the present invention is to provide an improved power steering system which can prevent the occurrence of hunting.

Still another object of the present invention is to provide an improved power steering system which can provide steering reaction or "feel" proportional to the actual steering resistance.

An additional object of the present invention is to provide an improved power steering systems which can prevent the occurrence of damage to the torsion bar in the event of power failure.

In accordance with the present invention, there is provided a hydraulic power steering system including a rotary control valve, the rotary control valve having an inner valve member rotatable with the input stub shaft and formed on its outer periphery with axially extending equally spaced pressure and return slots, an outer valve member concentrically mounted on the inner valve member for rotation with the output worm shaft, the inner valve member having an annular recess on its inner periphery and an orifice radially extending therethrough for communicating the annular recess with the pressure slots to permit the supply of pressure fluid into the annular recess so that no pressure difference occurs between the inner and outer peripheral surfaces of the inner sleeve. A piston member may be inserted between the inner sleeve and the stub shaft for axial sliding movement on the stub shaft, in which case, the fluid pressure introduced in the inner sleeve recess urges the inner sleeve away from the piston member so as to hold it against axial and diametrical displacement.

In a preferred embodiment, a plate member having thereon a projection such as a ball member is provided for rotation with the outer sleeve. The piston member is rotatable with the stub shaft and has a cutout adapted for receiving the projection to establish a temporary engagement between the piston member and the plate member under the fluid pressure supplied into the inner sleeve recess to urge the piston member toward the plate member. This arrangement can prevent hunting and provide steering reaction or "feel" proportional to the actual steering resistance.

BRIEF DESCRIPTION OF THE DRAWINGS

Other objects and advantages of the present invention will become apparent upon reading the following detailed description and upon reference to the drawings in which.

DETAILED DESCRIPTION OF THE INVENTION

Figure 1:
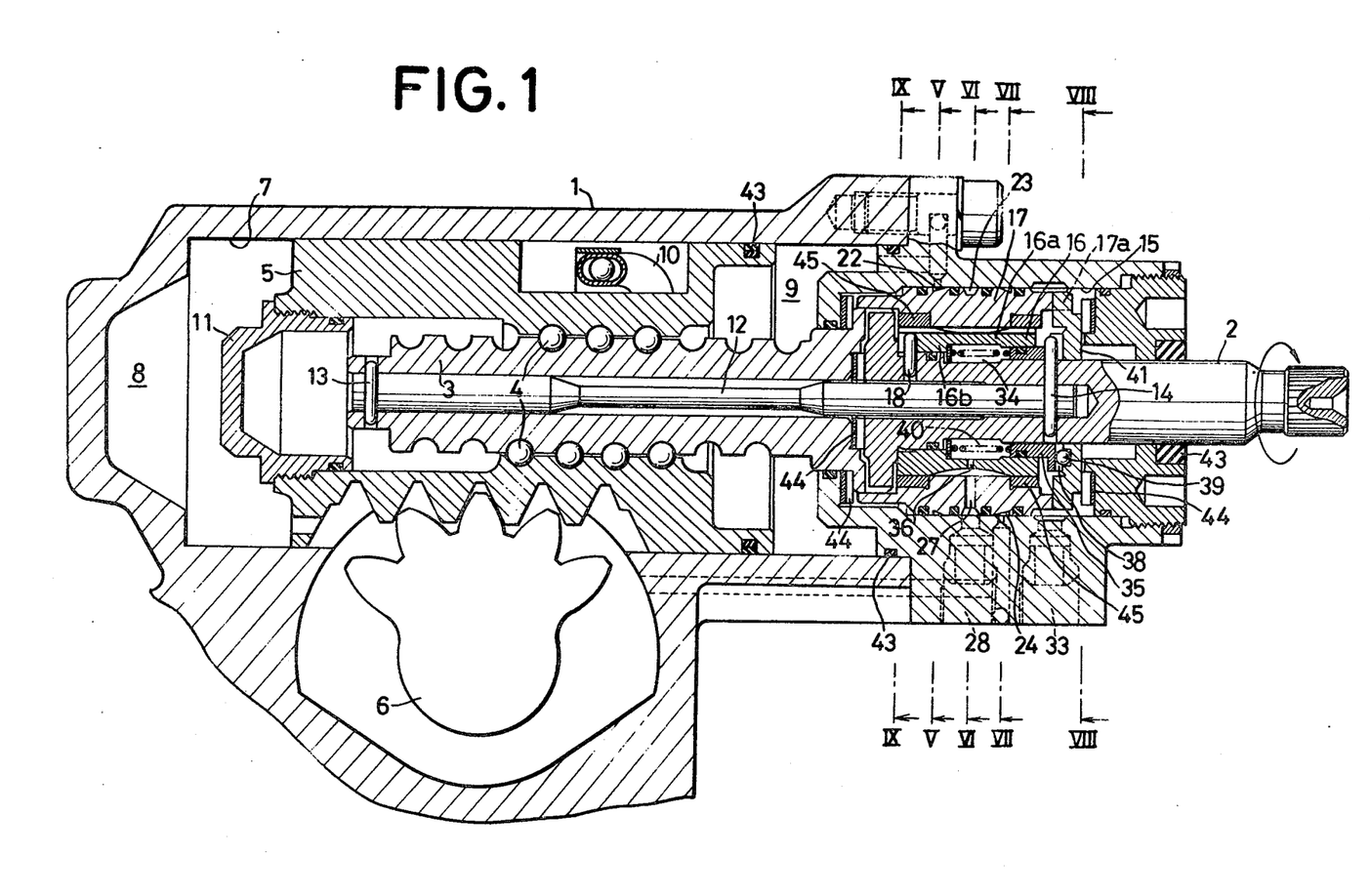
FIG. 1 is a vertical sectional view showing one embodiment of a power steering system made in accordance with the present invention.
Figure 2:
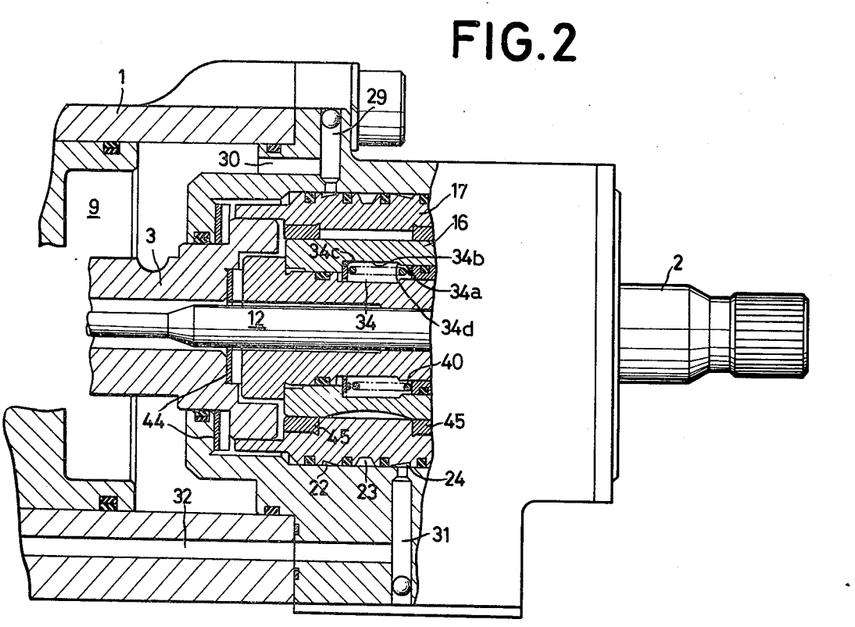
FIG. 2 is a fragmentary vertical sectional view taken along the line II—II of FIG. 5.

Referring now to the drawings wherein like reference numerals have been used throughout to designate like elements, FIG. 1 illustrates a power steering system comprises a steering gear housing 1 which contains a stub shaft 2 connected through the steering shaft (not shown) to the steering wheel (not shown) and a worm shaft 3 drivingly connected coaxially through a torsion bar 12 to the stub shaft 2. The worm shaft 3 is operatively engaged through a recirculating train of bearing balls 4 with a servo piston 5 one face of which is formed with a rack meshing with a sector gear 6 formed on the pitman shaft (not shown). The servo piston 5 has its large diameter portion defining at the opposite sides thereof a pair of pressure chambers 8 and 9 so that the servo piston 5 can reciprocate in the piston bore 7 defined by the gear housing 1 by rotation of the worm shaft 3 or the fluid pressure selectively supplied into the pressure chamber 8 or 9. In the Figure, the reference numeral 10 designates a pipe for recirculation of the train of bearing balls 4, and the numeral 11 a piston cover forming part of the servo piston apex.

Figure 3:
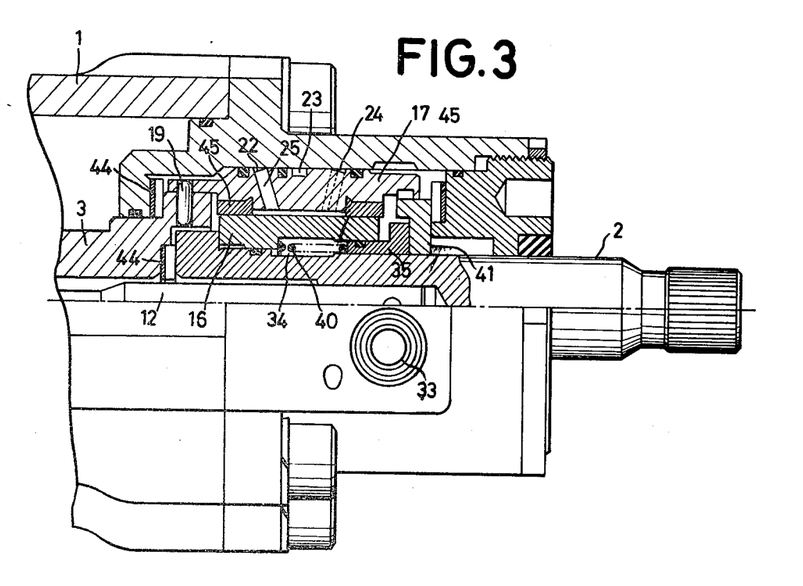
FIG. 3 is a fragmentary vertical sectional view taken along the line III—III of FIG. 5.

The stub shaft 2 and the worm shaft 3 are drivingly connected by a torsion bar 12 having at its intermediate portion of reduced diameter. The torsion bar 12 is coupled to the worm shaft by means of a connecting pin 13 and to the stub shaft by means of a connecting pin 14. Around the connection between the stub shaft 2 and the worm shaft 3 there is defined a cylindrical valve chamber 15 containing a rotary control valve which comprises an inner sleeve 16 connected to the stub shaft 2 by means of a connecting pin 18 for rotation with the stub shaft 2, and an outer sleeve 17 coaxially mounted on the inner sleeve 16 in sliding contact therewith and connected to the worm shaft 3 by means of a connecting pin 19 (indicated in FIG. 3) for rotation with the worm shaft 3.

The inner sleeve 16 has its outer periphery formed with six axially extending equally spaced slots, three of which are pressure slots and are designated by the reference numerals 21a, 21c and 21e, and the other three of which are return slots and are designated by the reference numerals 21b, 21d and 21f. The return slots 21b, 21d and 21f extend the full length of the inner sleeve 16 for communication with the valve chamber 15 which in turn is connected to an outlet port 33 through which fluid is drained.

The outer sleeve 17 is formed on its inner periphery with six axially extending equally spaced slots, three of which are first slots designated by the reference numerals 20a, 20c and 20e, and the other three of which are second slots designated by the reference numerals 20b, 20d and 20f. Formed on the outer periphery of the outer sleeve 17 are three annular grooves 22, 23 and 24. It can be seen from FIG. 5 that the annular groove 22 in the innermost location is communicated through passages 29 and 30 with the pressure chamber 9 and also is communicated with the first slots 20a, 20c and 20e through respective radially extending passages 25 formed in the outer sleeve 17. As can be seen by a study of FIG. 6 that the annular groove 23 in the central location is communicated with an inlet port 28 through which pressurized fluid is supplied and also is communicated with the pressure slots 21a, 21c and 21e through respective radially extending passages 27 formed in the outer sleeve 17. It may be understood by reference to FIG. 7 that the annular groove 24 in the outermost location is communicated through passages 31 and 32 with the pressure chamber 8 and also is communicated with the second slots 20b, 20d and 20f through respective radially extending passages 26 formed in the outer sleeve 17.

On the inner periphery of the inner sleeve 16 there is formed a stepped annular recess 34 having smaller and larger diameter recesses 34a and 34b. In the illustrated embodiment, the smaller diameter recess 34a is formed in the outer or input side of the inner sleeve 16 and the larger diameter recess 34b is formed in the inner or output side thereof. The inner sleeve 16 is further formed with an orifice 36 radially extending therethrough to communicate the annular recess 34 with the pressure slot 21c as clearly shown in FIG. 6. Inserted in the smaller dimeter recess 34a is a piston member 35 in sliding engagement with the stub shaft 2 so as to separate the annular recess 34 from the valve chamber 15.

Figure 4A:
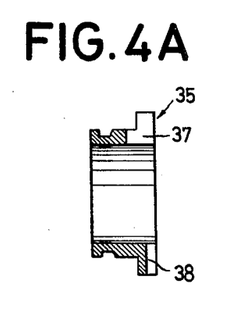
FIGS. 4A through 4C show the piston in section, in bottom, and in elevation, respectively.
Figure 4B:
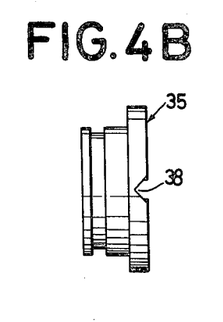
Figure 4C:
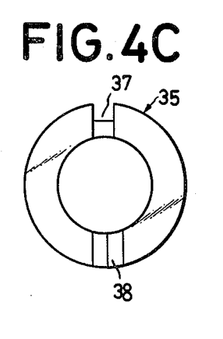

The piston member 35 has a configuration as illustrated in FIG. 4 such as to have on its large diameter portion a radially extending slit 37 and a triangular cross-sectional cutout 38 adapted for receiving therein a steel ball 39 to be described later in detail. The piston member 35 and the stub shaft 2 are connected for rotation as a unit by means of the connection pin 14 received in the slit 37 of the piston member 35. A resilient member such as a coil spring 40 may be provided in the annular recess 34 to urge the piston member 35 to the right in the drawing and also to urge the inner sleeve 16 to the left.

Figure 8:
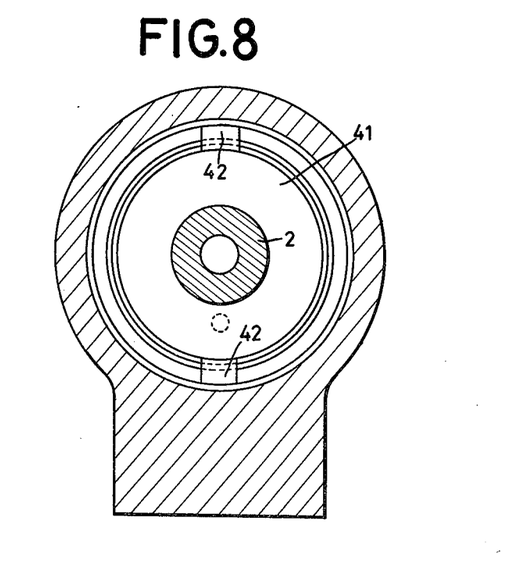
FIG. 8 is a fragmentary enlarged transverse sectional view taken along the line VIII—VIII of FIG. 1 showing the upper plate.

An annular upper plate 41 is loosely fitted on the stub shaft 2 at the rightward side of the piston member 35 which plate 41 is shown in FIG. 8 in detail as formed at its periphery with two slits 42 in engagement with projections 17a axially and outwardly extending from the outer sleeve 17 so that the upper plate 41 and the outer sleeve 17 can rotate as a unit. The annular upper plate 41 is formed on its inner surface with a pocket for holding the steel ball 39 in engagement with the cutout 38 of the piston member 35. In the Figures, the reference numeral 43 designates seal members and the number 44 thrust bearings. Metallic seal rings 45 are secured to the internal surface of outer sleeve 17.

Figure 5:
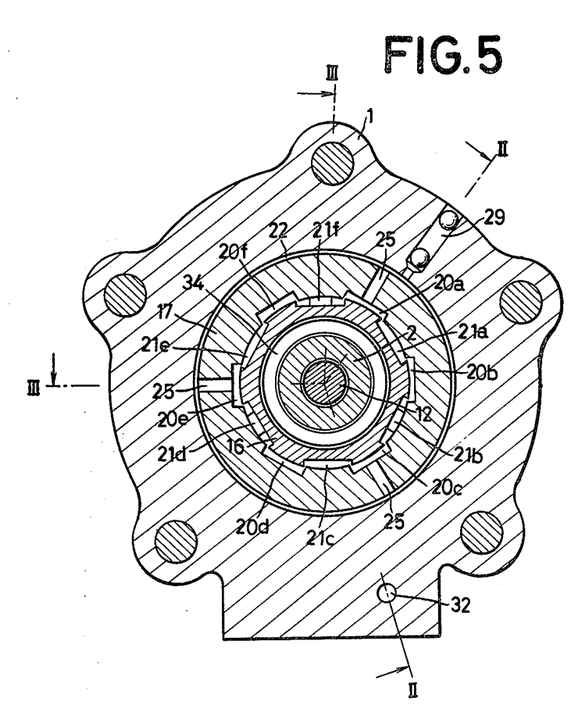
FIG. 5 is a transverse sectional view taken along the line V—V of FIG. 1 with the inner and outer sleeves shown in the neutral position.
Figure 6:
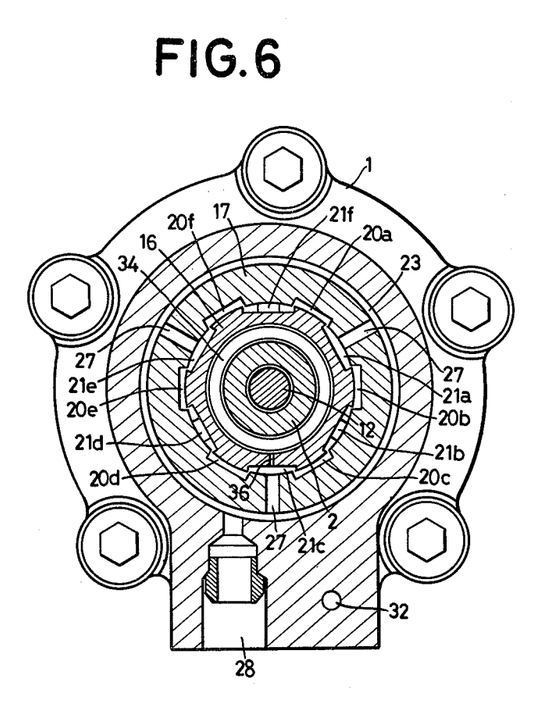
FIG. 6 is a transverse sectional view taken along the line VI—VI of FIG. 1 with the inner and outer sleeves shown in the neutral position.
Figure 7:
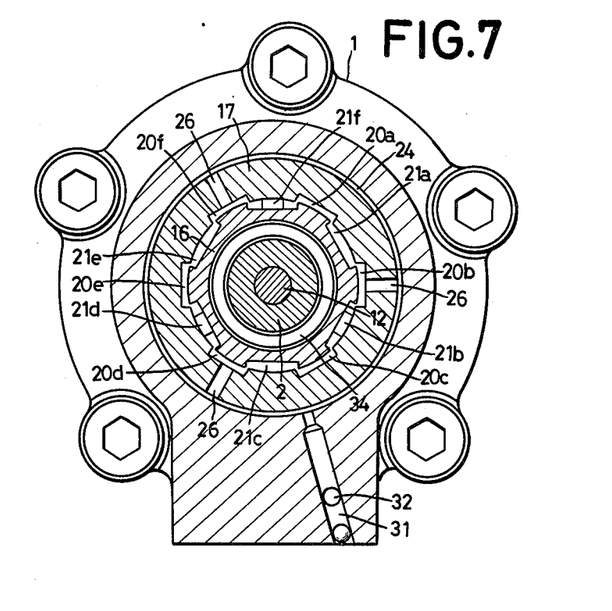
FIG. 7 is a transverse sectional view taken along the line VII—VII of FIG. 1 with the inner and outer sleeves shown in the neutral position.

The operation of the above described power steering system arranged in accordance with the present invention will now be described. Assuming first of all that the stub shaft 2 and the worm shaft 3 rotate by the same angle and no relative angular displacement is established between the stub shaft 2 and the worm shaft 3 such as when the vehicle operator turns the steering wheel under low road load conditions, the inner and outer sleeves 16 and 17 rotate in the same direction by the same angle. In this situation, the rotary valve is held in the neutral position as shown in FIGS. 5 through 7 where the inner sleeve slots 21a through 21f are in communication with the slots 20a and 20b, the slots 20b and 20c, the slots 20c and 20d, the slots 20d and 20e, the slots 20e and 20f, and the slots 20f and 20a, respectively. Thus, the fluid pressure supplied from the inlet port 28 is delivered through the annular groove 23, the passages 27, and pressure slots 21a, 21c and 21e to the outer sleeve slots 20a through 20f from which part of the fluid pressure is drained through the return slots 21b, 21d and 21f to the outlet port 33 and the remainder thereof is supplied through the passages 29 and 30 and the passages 31 and 32 into the pressure chambers 8 and 9, respectively. Since the magnitude of the fluid pressures introduced into the pressure chambers 8 and 9 is equal and the pressure chambers 8 and 9 are in communication with the drain as described above where the rotary control valve is in the neutral position, the servo piston 5 effects no power steering performance.

Where the worm shaft 3 cannot follow the rotation of the stub shaft 2 and some relative angular displacement is established between the stub shaft 2 and the worm shaft 3 such as when the vehicle runs under increased road load conditions, the corresponding relative angular displacement appears between the inner sleeve 16 and the outer sleeve 17. Assuming now that this occurs when the stub shaft 2 rotates in the clockwise direction as indicated by the arrow of FIG. 1, the inner sleeve 16 rotates in the clockwise direction relative to the outer sleeve 17 so that communications are established only between the slots 21a and 20b, the slots 21b and 20c, the slots 21c and 20d, the slots 21d and 20e, 21e, and 20f, and 21f and 20a, respectively. As a result, the pressurized fluid introduced into the intake port 28 is supplied through the annular groove 23, the passages 27 to the pressure slots 21a, 21c and 21e and hence through the slots 20b, 20d and 20f, the annular groove 24, and the passages 31 and 32 to the pressure chamber 8; whereas the pressure chamber 9 is communicated with the outlet port 33 through the valve chamber, the return slots 21f, 21b and 21d, the slots 20a, 20c and 20e, the annular groove 22, and the passages 29 and 30, so that the fluid pressure in the pressure chamber 8 becomes rather higher than that in the pressure chamber 9 to cause rightward movement of the servo piston 5 thereby rotating the worm shaft 3 in the clockwise direction until the relative angular displacement is reduced to zero.

Assuming the relative angular displacement occurs when the stub shaft 2 rotates in the counter-clockwise direction, the inner sleeve 16 rotates in the counter-clockwise direction relative to the outer sleeve 17 so that communications are established between the slots 21a and 20a, 21b and 20b, 21c and 20c, 21d and 20d, 21e and 20e, and 21f and 20f, respectively. As a result, the pressurized fluid introduced into the intake port 28 is supplied through the annular groove 23, the passages 27 to the pressure slots 21a, 21c and 21e and hence through the slots 20a, 20c and 20e, the annular groove 22, and the passages 29 and 30 to the pressure chamber 9; whereas the pressure chamber 8 is communicated with the outlet portion 33 through the valve chamber, the return slots 21b, 21d and 21f, the slots 20b, 20d and 20f, the passages 26, the annular groove 24 and the passages 31 and 32, so that the fluid pressure in the pressure chamber 9 becomes rather higher than that in the pressure chamber 8 to cause leftward movement of the servo piston 5 thereby rotating the worm shaft 3 in the counter-clockwise direction until the relative angular displacement is reduced to zero.

In accordance with the present invention, the inner sleeve 16 has an annular recess 34 on its inner periphery and an orifice 36 radially extending therethrough to communicate the annular recess 34 with the pressure slot 21c formed on the outer periphery of the inner sleeve 16 so as to permit the supply of pressure fluid into the annular recess 34. Thus, no pressure difference cannot appear between the inner and outer peripheral surfaces of the inner sleeve member 16. This arrangement is effective to prevent strain to the inner sleeve 16, which occurs in the prior art power steering systems due to pressure difference between the inner and outer peripheral surfaces of the inner sleeve, so as to insure a good sealing reliability between the inner and outer sleeves 16 and 17.

In a preferred arrangement the inner sleeve 16 is formed on its inner periphery with a stepped annular recess composed of a smaller diameter recess 34a and a larger diameter recess 34b with which the pressure slot 21c is communicated through the radially extending orifice 36, and an annular piston member 35 is inserted in the smaller diameter recess 34a in axially sliding movement on the stub shaft 2 to provide a seal between the larger diameter recess 34b and the valve chamber so that the inner sleeve 16 can be urged to the left by the fluid pressure introduced into the larger diameter recess 34b and exerting on the inner walls of the annular recess (the area of the leftward inner wall 34c is larger than that of the rightward inner wall 34d in the illustrated embodiment). It is noted that the fluid pressure in the annular recess also urge the piston member 35 to the right. A resilient member such as a coil spring 40 may be interposed between the piston member 35 and the leftward inner wall of the recess to increase the force to urge the inner sleeve 16 to the left and the piston member 35 to the right. This arrangement is effective to hold the inner sleeve 16 against axial and diametrical displacement so as to provide a stable inner sleeve rotation.

In another preferable arrangement, the annular piston member 35 has on its face a cutout 38 adapted for receiving the projection such as a steel ball 39 fixed in the pocket of the upper plate 41 so that a temporary engagement is established between the piston member 35 coupled to the stub shaft 2 and the upper plate member 41 coupled to the outer sleeve 17 under the fluid pressure supplied into the inner sleeve recess 34 and/or the spring member 40 interposed therein to urge the piston member 35 toward the plate member 41. It is to be understood that a relatively strong force is required to release such engagement. Thus, even where the torsion bar 12 has a low spring constant to readily cause relative angular displacement between the stub shaft 2 and the worm shaft 3 such as during running under low road load conditions, the stub shaft 2 and the worm shaft 3 can be maintained in zero relative angular displacement below a predetermined torque difference therebetween. This arrangement is effective to certainly prevent the occurrence of hunting since the engagement between the piston member 35 and the upper plate member 41, or between the stub shaft 2 and the worm shaft 3, cannot be released without a relatively strong force. In addition, the arrangement can provide steering reaction or "feel" proportional to the actual steering resistance since the force required for the steel ball to be released from the engagement is proportional to the road load.

Figure 9:
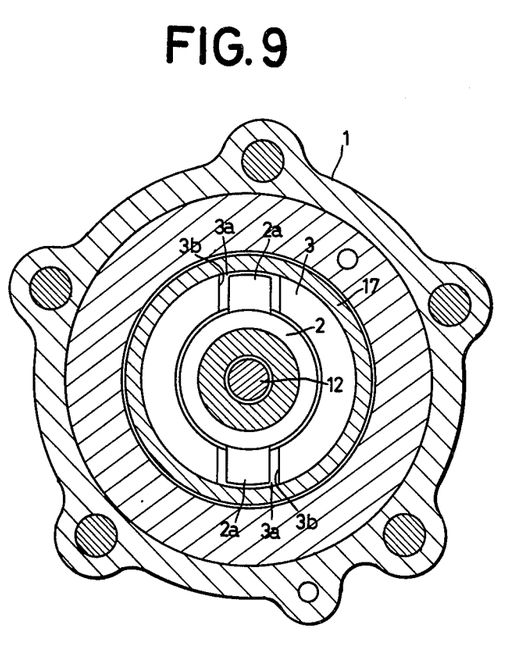
FIG. 9 is a fragmentary transverse enlarged sectional view taken along the line IX—IX of FIG. 1.

FIG. 9 illustrates a further preferable arrangement wherein the stub shaft 2 terminates at its leftward end in a diametrically outwardly extending flange 2a which is received in a recess 3b formed at the end of the worm shaft 3 with a predetermined clearance so that the flange 2a abuts against the inner wall 3b of the recess 3a when the relative angular displacement between the stub shaft 2 and the worm shaft 3 becomes excessively large so as to permit the stub shaft 2 to directly turn the worm shaft. This arrangement is effective to prevent damage to the torsion bar which sometimes occurs in the event of failure of the fluid pump.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. In a hydraulic power steering system, having an output shaft, including a rotary control valve contained in the valve chamber, said rotary control valve including an inner valve member rotatable with the input stub shaft and formed on its outer periphery with axially extending equally spaced pressure and return slots, an outer valve member concentrically mounted on said inner valve member in sliding contact therewith for rotation with the output shaft, said inner valve member having a portion defining an annular recess on its inner periphery and an orifice radially extending therethrough for communication of said annular recess with said pressure slot to permit the supply of pressure fluid into said annular recess so that no pressure difference occurs between the inner and outer peripheral surfaces of said inner valve member.

2. In a hydraulic power steering system having an output shaft, including a rotary control valve contained in the valve chamber, said rotary control valve including an inner valve member rotatable with the input stub shaft and formed on its outer periphery with axially extending equally spaced pressure and return slots, an outer valve member concentrically mounted on said inner valve member in sliding contact therewith for rotation with the output shaft, said inner valve member having on its inner periphery a portion defining a stepped annular recess composed of smaller and larger diameter recesses, said inner valve member having an orifice radially extending therethrough for communicating said larger diameter recess with said pressure slot to permit the supply of pressurized fluid into said larger diameter recess, an annular piston member inserted in said smaller diameter recess for axially sliding movement on the stub shaft to provide a seal between said larger diameter recess and the valve chamber so that the fluid pressure supplied in said larger diameter recess can urge said inner valve member away from said piston member.

3. A hydraulic power steering system as set forth in claim 2, which further comprises a spring member interposed between said piston member and one inner wall of said recess to increase the force urging said inner valve member.

4. A hydraulic power steering system as set forth in claim 2, wherein said smaller diameter recess is formed in the input side of said inner valve member so that said inner valve member can be urged toward the output side.

5. In a hydraulic power steering system having an output shaft, including a rotary control valve contained in the valve chamber, said rotary control valve including an inner valve member rotatable with the input stub shaft and formed on its outer periphery with axially extending equally spaced pressure and return slots, an outer valve member concentrically mounted on said inner valve member in sliding contact therewith for rotation with the output shaft, a first plate member rotatable with said outer valve member and having thereon a projection, a second plate member rotatable with the stub shaft and movable toward and away from said first plate member, said second plate member having thereon a cutout for receiving said projection, means for urging said second plate member toward said first plate member so as to establish a temporary engagement between said first and second plate members through said projection.

6. A hydraulic power steering system as set forth in claim 5, wherein said projection comprises a ball member.

7. In a hydraulic power steering system, having an output shaft, including a rotary control valve contained in the valve chamber, said rotary control valve including an inner valve member rotatable with the input stub shaft and formed on its outer periphery with axially extending equally spaced pressure and return slots, an outer valve member concentrically mounted on said inner valve member in sliding contact therewith for rotation with the output shaft, said inner valve member formed on its inner periphery with a portion defining a stepped annular recess having a smaller diameter recess in its input side and a larger diameter recess in its output side, said inner valve member having an orifice radially extending therethrough for communication of said larger diameter recess with said pressure slot to permit the supply of pressurized fluid into said larger diameter recess, an annular piston member inserted in said smaller diameter recess for rotation with the stub shaft and for axially sliding movement on the input stub shaft to provide a seal between said larger diameter recess and the valve chamber, a plate member rotatable with said outer valve member and having thereon a projection, said piston member having thereon a cutout for receiving said projection so as to establish a temporary engagement between said piston member and said plate member under the fluid pressure supplied into said inner sleeve recess to urge said piston member toward said plate member.

8. A hydraulic power steering system as set forth in claim 7, wherein said projection comprises a ball member.

9. A hydraulic power steering system as set forth in claim 7, which further comprises a spring member interposed between said piston member and one inner wall of said recess so as to increase the force to urge said piston member.

* * * * *

UNITED STATES PATENT AND TRADEMARK OFFICE
CERTIFICATE OF CORRECTION

PATENT NO. : 4,173,987
DATED : November 13, 1979
INVENTOR(S) : Masanori Kouda

It is certified that error appears in the above-identified patent and that said Letters Patent are hereby corrected as shown below:

Column 1, line 30   correct the spelling of "power"

line 66, (or 67), cancel "is" after "tion"

Column 2, line 26, change "systems" to --system--

Column 3, line 6, the colon should be a semicolon line 27, change "comprises" to --comprising--

Signed and Sealed this

Sixth Day of May 1980

[SEAL]

Attest:

SIDNEY A. DIAMOND

Attesting Officer      Commissioner of Patents and Trademarks